(12) United States Patent
Shih et al.

(10) Patent No.: US 8,486,592 B2
(45) Date of Patent: Jul. 16, 2013

(54) NANOPARTICLE DISPERSION TO IMPROVE RADIATION SENSITIVITY

(75) Inventors: Hsiao-Yi Shih, Whippany, NJ (US); Guojin Lu, Wayne, NJ (US); David F. Lewis, Monroe, CT (US); Xiang Yu, Bridgewater, NJ (US)

(73) Assignee: ISP Investments Inc., Wilmington, DE (US)

( * ) Notice: Subject to any disclaimer, the term of this patent is extended or adjusted under 35 U.S.C. 154(b) by 611 days.

(21) Appl. No.: 12/728,871

(22) Filed: Mar. 22, 2010

(65) Prior Publication Data

US 2010/0247899 A1 Sep. 30, 2010

Related U.S. Application Data

(60) Provisional application No. 61/164,504, filed on Mar. 30, 2009.

(51) Int. Cl.
*G03C 1/00* (2006.01)
*G03C 1/725* (2006.01)
*G03C 1/73* (2006.01)

(52) U.S. Cl.
USPC .......... 430/11; 430/13; 430/56; 430/84; 430/92; 430/95; 430/96; 430/133

(58) Field of Classification Search
None
See application file for complete search history.

(56) References Cited

U.S. PATENT DOCUMENTS

| 5,420,000 | A  | * | 5/1995  | Patel et al.     | 430/332   |
|-----------|----|---|---------|------------------|-----------|
| 5,672,465 | A  | * | 9/1997  | Patel et al.     | 430/332   |
| 6,783,914 | B1 | * | 8/2004  | Fedynyshyn       | 430/190   |
| 2003/0129759 | A1 | * | 7/2003  | Lewis et al.   | 436/58    |
| 2003/0228748 | A1 | * | 12/2003 | Nelson et al.  | 438/612   |
| 2006/0134551 | A1 | * | 6/2006  | Anyumba et al. | 430/270.1 |
| 2006/0145091 | A1 | * | 7/2006  | Patel          | 250/474.1 |

OTHER PUBLICATIONS

Chen et al., Study of ruthenium complex sensitizer and gold nanoparticles doped flexbile organic solar cells, 2012.*

* cited by examiner

*Primary Examiner* — Hoa (Holly) Le
(74) *Attorney, Agent, or Firm* — William J. Davis; Thompson Hine LLP

(57) ABSTRACT

A radiation-sensitive material comprising a support and a radiation sensitive composition on the support is disclosed, wherein the radiation sensitive composition includes a dispersion containing nanoparticles of a sensitizer.

11 Claims, No Drawings

NANOPARTICLE DISPERSION TO IMPROVE RADIATION SENSITIVITY

FIELD OF THE INVENTION

The present invention relates to nanoparticle dispersions and radiation sensitive materials containing nanoparticle dispersions wherein the radiation sensitive materials exhibit enhanced sensitivity and to the use of the radiation sensitive materials in a media for accurate and high resolution image recording and visual display.

BACKGROUND

Photochromic polyacetylenes responsive to radiation exposure have been disclosed in several U.S. Patents, namely U.S. Pat. Nos. 4,066,676; 4,581,315; 3,501,302; 3,501,297; 3,501,303; 3,501,308; 3,772,028; 3,844,791, 3,954,816, 5,232,820, 5,731,112, 6,017,390, 6,177,578, and 7,445,880. The relevant disclosures in these patents are hereby incorporated by reference.

Radiochromic film is based on the polymerization of diacetylene monomers upon exposure to ionizing radiation (e.g., X-ray). Such polymerization is a combination of intrinsic sensitivity and amount of the adsorbed energy. One of the ways to improve sensitivity as demanded for applications in radiology and radiograph is to dope the active with materials of high atomic (Z) element.

The high Z element adsorbs more kilo-voltage x-ray and generates photoelectrons which in turn increases the energy adsorption by diacetylene monomer to initiate the polymerization. This results in an apparent improvement in the sensitivity of the radiation sensitive materials.

Conventional methods of incorporating a high Z element into the radiation sensitive film typically involve the use of water soluble compounds like CsBr as additives in the coating fluids. The water insolubility of most compounds containing high Z elements has prevented its application in this field since the opaque particles negatively impact the clarity of the film and image quality, and thus cancel out any possible gain from the increased x-ray adsorption. Nanoparticles, having excellent optical properties that can produce a clear film, when well dispersed in media and matrix, can be an excellent alternative to the water soluble additives.

The current invention describes materials, methods and processes to make and apply nanoparticle dispersion into a radiation sensitive film to enhance the radiation sensitivity of self-developing films.

SUMMARY OF THE INVENTION

In one aspect, the present invention provides a radiation sensitive material comprising a support and a radiation sensitive composition on the support, wherein the radiation sensitive composition comprises a dispersion containing nanoparticles of a sensitizer.

In accordance with another aspect of the present invention, a process is disclosed for improving the radiation sensitivity of a radiation sensitive composition by including nanoparticles of a sensitizer in the composition. In accordance with more particular aspects of the invention, the radiation sensitive composition comprises an active component such as a diacetylene monomer that polymerizes upon exposure to ionizing radiation.

DETAILED DESCRIPTION

In accordance with one aspect of the present invention nanoparticle dispersions and radiation sensitive materials containing the nanoparticle dispersions are disclosed wherein the nanoparticle dispersions improve the sensitivity of radiation sensitive materials containing the nanoparticle dispersions. The nanoparticle dispersions contain sensitizer particles having an average particle size in the range of about 1 nm to about 500 nm.

The term "radiochromic film" as used herein generally refers to film that changes color and produces a visible image when exposed to ionizing radiation, but experiences insignificant change from exposure to visible light or other forms of non-ionizing radiation.

The tell "ionizing radiation" as used herein generally refers to radiation with a level of energy that is high enough to cause atoms to lose electrons and become charged or ionized. Ionizing radiation may be in the form of a high energy particles, like an alpha or beta particles, or in the form of electromagnetic waves, like gamma rays or x-rays. High energy particles and electromagnetic waves are released from the nuclei of radioactive atoms that are decaying or may be created by causing accelerated electrons to strike a metal target.

One embodiment of the present invention relates to the use of a radiation sensitive composition containing a radiation sensitive active component similar to that on a radiochromic film such as GAFCHROMIC® radiochromic films manufactured by International Specialty Products. Specific examples of radiation sensitive compositions that can be modified to include a nanoparticle dispersion for use in the present invention include, but are not limited to, those disclosed in the patents referenced above as well as U.S. Patent Application Publication 2003/0129759 to Lewis et al., the disclosure of which is incorporated herein in its entirety.

Although the present invention is not limited to a particular type of radiation sensitive material, the following description relates to an embodiment of the invention based on the use of a particularly useful type of material similar to that used in GAFCHROMIC® radiochromic films. GAFCHROMIC® radiochromic films are self developing, not significantly sensitive to normal room light, and can be cut to a desired size. Exposure to ionizing radiation causes the radiochromic film to immediately change color, typically becoming darker. The degree of darkening is proportional to exposure and can be quantitatively measured with a densitometer or scanner.

The active component in the GAFCHROMIC® film media is a micro-particulate, radiation sensitive monomer that is dispersed in a polymer matrix and coated onto a polyester film base. When the active monomeric component is exposed to ionizing radiation, a polymerization reaction is initiated, resulting in the production of a dye polymer. Since the polymer is by nature, a dye, the exposure produces coloration within the film. The active ingredient in accordance with particular embodiments comprises a long chain fatty acid belonging to a class of molecules known as diacetylenes. Many members of the diacetylene family are characteristically radiation sensitive only when there is intermolecular order, as, for instance, in a crystalline or micellar state. Suitable acetylenic compounds have the structure $A\text{-}(CH_2)_n\text{---}C\!\!=\!\!C\text{---}C\!\!=\!\!C\text{---}(CH_2)_m\text{---}B$, where n and m are both independently an integer of from about 0 to 20, more particularly from about 6 to 14, and A and B are independently a methyl group, a carboxyl group or metal carboxylate group. When exposed to radiation, active diacetylenes undergo a solid-state polymerization reaction producing a dye polymer referred to as a polydiacetylene. The color and spectral absorbance of polydiacetylene is specific to the particular molecular structure, but preferably the color change is clearly visible on the radiation sensitive film. The color change is frequently cyan blue, purple or magenta.

Specific examples of such polyacetylenes include, but are not limited to, pentacosa-10,12-diynoic acid; 13,15-octacosadiyne and docosa-10,12-diyne-1,22-dioic acid. Of these, pentacosa-10,12-diynoic acid is particularly useful since it provides unusually high sensitivity to ionizing radiation exposure. It is to be understood however, that dispersions of other normally crystalline, color developing polyacetylenes having a conjugated structure can be employed alone or in admixture with the preferred diynes as the image receptive layers of the present invention. Such compounds include the diynes of the above structure wherein the A and/or B moieties, in addition to lower alkyl or carboxyl, can also be hydroxy, amido, lower alkyl substituted amido, an aliphatic or aromatic carboxylate ester group having up to 10 carbon atoms, a mono- or di-valent carboxylate metal salt group, halo, carbamyl, lower alkyl substituted carbamyl or tosyl, as well as the corresponding triyne and tetrayne products of the above polyacetylenes having from about 20 to 60 carbon atoms and a conjugated structure. Examples of these compounds include 10,12-docosadiynediol, the ditoluene-p-sulfonate of 9,11-eicosadiynoic acid, the monoethyl ester of 10,12-docosadiynedioic acid, the lithium, sodium or potassium salt of 10,12-pentacosadiynoic acid, the zinc salt of heneicosa-10,12-diynoic acid, the manganese salt of eicosa-5,7-diynoic acid, 10,12-docosadiyne chloride, 10,12-pentacosadiyne (m-tolyl-urethane), 10,12-pentacosadiyne {[(butoxyl-carbonyl)-methyl]urethane}, N-(dimethyl)-10,12-pentacosadiynamide, N,N'-bis(a 1-methylbenzy-1) 10,12-pentacosadiyndiamide and the like. In addition, the diacetylenes for use in accordance with the invention generally may also have the formula:

wherein R and R' are, for example, both $CH_2$—O—CON—H—$(CH_2)_5CH_3$. Such diacetylenes polymerize in the solid state either upon thermal annealing or exposure to high energy radiation. Suitable compounds are described in U.S. Pat. Nos. 5,420,000, 4,970,137, and 4,734,355, the contents of each of which are incorporated herein by reference. Preferably, the polyacetylenic compound has at least two conjugated acetylenic linkages and contains from about 10 to 60 carbon atoms.

The radiation sensitive compositions disclosed herein also include a dispersion of sensitizer nanoparticles that enhance the sensitivity of the polyacetylene. The sensitizers useful herein include those typically known to enhance solubility that are of nanometer size or have been reduced to nanometer size. The sensitizers may include those elements from bromine (z=35) to bismuth (z=83). Examples of useful sensitizers include, but are not limited to, barium sulfate, calcium tungstate, bismuth oxide, bismuth halides.

Nanoparticles that are particularly useful in the present invention typically have an average particle size in the range of about 1 to about 500 nm, more particularly from about 10 to about 100 nm. Some of these materials are commercially available such as from American Elements and Nanophase Technologies Corporation, among many companies.

The nanoparticles are typically dispersed in a dispersing reagent to prepare a dispersion of nanoparticles suitable for incorporating into the radiation sensitive composition. Water soluble polymeric binding materials and/or surfactant can be used as dispersing reagents. Useful examples of water soluble polymeric binding materials include, without limitation, polyvinyl alcohol solution, polyvinyl pyrrolidone, polyacrylic acid, polyoxylene, polyethylene amine, polyethylene imine and copolymers thereof. One of ordinary skill in the art can readily determine the concentrations for the dispersing reagent and the nanoparticles in the dispersing reagent. Typically, the dispersing reagent is prepared as a 0.1% to 50% solution in water or other solvent and the nanoparticles are added in an amount of about 1 to about 90% based on weight. The nanoparticle dispersion is added to the radiation sensitive composition in an amount effective to improve sensitivity of the composition and generally in an amount of from about 1% to 1000%, and more particularly from about 10% to 500% by weight of the radiation sensitive materials as described hereinafter.

Suitable compounds, which selectively absorb incident low energy photon radiation, are the metal halides and combinations thereof of Group I of the Periodic Table. Particularly useful are Group I metal chlorides, bromides and iodides. These compounds may be added in an amount effective to selectively absorb the incident low energy photon radiation, and generally in an amount of from about 0.1% to 80.0%, and more particularly from about 5% to 40% by weight of the dispersion of the coating as described hereinafter.

In accordance with some aspects of the invention, such halides are selected from the group consisting of cesium and rubidium halides and in particular, cesium chloride, cesium bromide, cesium iodide and combinations thereof.

In addition, it is possible to add an additional compound, which may be a metal ion chelating agent or sequestering agent. The chelating agent can be added in amounts of from about 0.01% to 10.0%, and more particularly from about 0.1% to 2% by weight, based on the weight of the diacetylene compound. Typical chelating agents include disodium ethylenediaminetetraacetate, sodium oxalate, citric acid, sodium citrate, sodium tartrate, sodium polyphosphate, potassium hypophosphate, sodium diethyldithiocarbamate, the sodium salt of N,N,N',N'-ethylenediaminetetra(methylenephosphonic acid), the sodium salt of 1-hydroxyethane-1,1-diphosphonic acid and combinations thereof.

An antioxidizing agent may also be added to the composition, usually in an amount of from about 0.01% to 5%, and more particularly from about 0.1 to 1% by weight of the weight of the diacetylene component. Suitable antioxidizing agents include propyl gallate, Tenoxo 6 (Tenox® is a trademark of the Eastman Chemical Company), Tenox® 2, Tenox® 7, Tenox® 20, sodium diethyldithiocarbamate, citric acid, sodium citrate, ascorbic acid, alkali metal sulfides and sulfites, 3-tert-butyl-4-hydroxy-5-methyl-phenyl sulfide, butylated hydroxytoluene, butylated hydroxyanisole, tert-butylhydroquinone, hydroxylamine and hydroxylamine hydrochloride.

The acetylenic component may also be sandwiched between two substrates in which one or both of the substrates may have the capability to filter or absorb light in the UV and/or visible wavelength regions. At least one of the substrates should be transparent in at least part of the visible spectrum.

Particularly useful as substrates are thin, flexible films made from materials such as polyethylene teraphthalate, polyethylene, polypropylene, cellulose acetate and the like.

In accordance with a particular method for preparing a radiation sensitive material useful herein, the polyacetylenic compound is dispersed in a non-solvating liquid and may be ripened or aged to maximize its radiation sensitivity. This dispersion may also contain a dissolved polymeric binder. Examples of binders include, but are not limited to, gelatin, agar, xanthan gum, polyvinylalcohol and polymers and copolymers containing maleic acid or acrylic acid residues, or salts thereof. The liquid dispersion is then applied onto the surface of a film, e.g., a polyester or similar film, and the coating is then dried. In particular, the normally crystalline or molecularly ordered polyacetylenic compound is dispersed into the non-solvating liquid in a concentration of from about 2 to 50% based on the combined weights of the polyacetylenic compound, the non-solvating liquid and the polymeric binder dissolved therein. The dispersion may then be aged or ripened by either (a) storing the composition at a temperature of from about 0° C. to about 12° C. for a period of from about 1 to 30 days, or (b) freezing the dispersion at a temperature between about −78° C. and about −1° C. for a period of time from about 1 to about 75 hours, or (c) heating the dispersion to a temperature between about 40° C. and about 100° C. for a period of time between about 10 minutes and 24 hours, or (d) a combination of any of the above techniques. This aging or ripening step is to be completed before drying the dispersion on the substrate.

In accordance with one aspect of the present invention, after the aging or ripening of the dispersion, a compound containing an elemental component which selectively absorbs incident low energy photon radiation <200 keV is mixed therewith in an amount which is effective to absorb incident low energy photon radiation when the dried composition is exposed thereto. Examples of elemental components that may be useful include, but are not limited to, chlorine, bromine, iodine, potassium, rubidium, cesium, barium, tungsten, lead and bismuth.

The thus mixed composition is then applied as a layer onto a substrate or support layer. Examples of substrates or supports that may be used include, but are not limited to, polymeric, metallic, glass, silicon and gallium arsenide. In accordance with a particular embodiment of the invention, the substrate or support layer may be a polymeric film which is permeable to low energy x-rays. The thus coated substrate is then dried at a temperature from about ambient up to about 100° C. but below the distortion temperature of the substrate and below the decomposition temperature of any of the components of the coating or the melting point of the polyacetylene compound therein. The drying operation is generally conducted over a period of from about 20 seconds to about 10 hours and is typically effected at 15° to 60° C. for a period of from about 1 minute to about 5 hours.

The film thus formed is sensitive to radiation and, upon irradiation, a polymerization process is initiated in the polyacetylenic compound resulting in an immediate change in the color of the coating. The color darkens in proportion to the radiation exposure and is enhanced as a result of the nanoparticle dispersion in the composition. The degree of darkening may be measured with a number of instruments including densitometers, spectrophotometers and film scanners. Generally when making such measurements, the color change of a transparent film sample would be assessed by measuring the proportion of light transmitted through the sample. Similarly, film coated on an opaque film base would be appropriately examined by measuring the proportion of light reflected from the sample.

Since the film darkens in proportion to radiation exposure, it is possible to measure the darkening and use this measurement as a means for determining the amount of the radiation exposure based on the calibration determined as described herein. Thus, the film may be employed as a radiation dosimeter, to measure and map radiation fields.

The radiation may be any type of ionizing radiation. Preferably the ionizing radiation takes the form of alpha particles, beta particles, x-rays, Gamma rays, short wavelength UV, neutrons or charged particle radiation. These particles or rays may be formed by decaying radioactive atoms, or by accelerated electrons or other charged particles striking a metal target or causing a discharge in a volume of gas. In one embodiment of the present invention the radiation is gamma radiation produced by iridium, preferably iridium-192. In another embodiment of the present invention the radiation is x-ray radiation. X-rays are produced when electrons collide with the atoms and nuclei of a metal target.

In accordance with certain embodiments of the present invention, the radiation sensitive composition forms a substantially transparent coating when disposed on a substrate. The term "substantially transparent" refers to a coating that causes very little if any scattering of light transmitted through the coating. Transparent coatings are particularly useful in accordance with certain aspects of the present invention. A transparent coating maximizes the benefit of any sensitizer, particularly if the radiation sensitive film is on a reflective substrate.

For example, consider two coatings made with the same diacetylene and the same sensitizer, but in one case (Coating #1) the sensitizer was <250 nm in size and in the other (Coating #2) the sensitizer was >500 nm in size. Both films are exposed to the same dose of radiation and the reflection densities of the two films are measured. Coating #1 with the smaller sensitizer particles will have the higher density, i.e. it will appear darker and therefore more sensitive. This is because, with the small particles, the coating will be transparent and light will travel through the coating, be scattered back by the reflective substrate, and pass through the coating a second time before entering the observer's eye. The coating acts as an optical element with an effective optical path length of 2D where D is the thickness of the coating. For Coating #2, with the large particles of sensitizer, the coating will not be transparent and a high proportion of light will be scattered back to the observer before it has penetrated the full thickness of the coating. The effective optical path length will be <2D. Even though the two coatings have the same amount of polyacetylene, the optical path length of Coating #1 is greater than Coating #2. By Beer's Law Coating #1 will appear darker and therefore be more sensitive than Coating #2.

Certain aspects of the present invention is described in more detail in the following non-limiting examples.

EXAMPLE 1

Bismuth Oxide Nano-Particles Dispersion

Part A was prepared by dissolving PVA in water to provide a 20% water solution.

Mix 70 g of Part A and 30 g of solid Bismuth Oxide nano-particles and sonicate the mixture until all bismuth oxide particles were well dispersed.

EXAMPLE 2

(Comparative) Preparation of Coating Fluid

Part A was a LiPCDA dispersion which was prepared by the similar method described in commonly-assigned U.S. Pat. No. 7,445,880 entitled "Lithium Salt of Polyacetylene as Radiation Sensitive Filaments and Preparation and Use Thereof."

Part B was prepared by dissolving PVA in water to provide a 20% water solution.

A coating fluid was formed by mixing 10 g of Part A, and 10 g of Part B.

EXAMPLE 3

Preparation of Coating Fluid Containing Nano-Particles

Parts A and B were the same as in the Example 2.
Part C was Nanoparticle dispersion as prepared in Example 1.
A coating fluid was formed by mixing 10 g of Part A, 3 g of Part B and 10 g of Part C.

EXAMPLE 4

Sensitivity Improvement of Radiochromic Film

Sample A was film coated on an opaque substrate with the coating fluid prepared as in Example 2.
Sample B was film coated on a same opaque substrate with coaling fluid prepared as in Example 3.
When these two coatings were exposed to a dose of 1 Rad with x-ray, the net density change of the two coatings are shown in table 1:

| Delta density | Coating A (Comparative) | Coating B |
|---|---|---|
| net red density at 1 Rad exposure | 0.01 | 0.2 |

It is contemplated that the inventive concepts herein described may be variously otherwise embodied and it is intended that the appended claims be construed to include alternative embodiments of the invention except insofar as limited by the prior art.

What is claimed is:

1. A radiation-sensitive material comprising:
   (a) a substrate; and
   (b) a radiation sensitive composition disposed on said substrate,
   wherein the radiation sensitive composition comprises an acetylenic radiation sensitive active component and a nanoparticle dispersion containing nanoparticles of a sensitizer wherein the nanoparticles have an average particle size of about 1 nm to about 500 nm, and wherein the sensitizer improves the radiation sensitivity of the acetylenic radiation sensitive active component.

2. The radiation-sensitive material of claim 1, wherein said radiation-sensitive material is a radiochromic self-developing film.

3. The radiation-sensitive material of claim 1, wherein the radiation sensitive active component comprises a substantially crystalline image receptive polyacetylenic compound.

4. The radiation-sensitive material of claim 3, wherein said substantially crystalline image receptive polyacetylenic compound has the structure:

wherein m and n are both independently an integer from 6 to 14 and A and B are independent from one another and are selected from the group consisting of methyl, carboxyl, hydroxy, amido, lower aklyl substituted amido, aliphatic or aromatic carboxylate ester group having up to 10 carbon atoms, mono- or di-valent carboxylate metal salt group, halo, carbamyl, lower aklyl substituted carbamyl or tosyl, triyn or tetrayne products of the above polyacetylenes having from 20 to 60 carbon atoms and a conjugated structure, and combinations thereof.

5. The radiation-sensitive material of claim 4, wherein said polyacetylenic compound is a mono-valent carboxylate metal salt.

6. The radiation-sensitive material of claim 5, wherein said mono-valent carboxylate metal salt is a lithium salt.

7. The radiation-sensitive material of claim 1, wherein said sensitizer includes at least one sensitizer selected from the group consisting of elements from bromine (z=35) to bismuth (z=83).

8. The radiation-sensitive material of claim 4, wherein said sensitizer comprises bismuth.

9. The radiation-sensitive material of claim 1, wherein said radiation sensitive composition is substantially transparent.

10. The radiation-sensitive material of claim 1, wherein the radiation sensitive active component is lithium pentacosa-10, 12-diynoic acid (LiPCDA).

11. A method for improving radiant energy sensitivity of an image-forming diacetylene compound comprising:
   (a) dispersing nanoparticles of a sensitizer in a dispersing agent to form a nanoparticle dispersion, where the sensitizer improves the radiation sensitivity of the image-forming diacetylene compound; and
   (b) formulating a coating fluid comprising the nanoparticle dispersion and an image-receptive polyacetylene compound.

* * * * *